(12) United States Patent
Zhang et al.

(10) Patent No.: US 10,267,296 B2
(45) Date of Patent: Apr. 23, 2019

(54) COMBINED SOLAR THERMAL POWER GENERATION SYSTEM

(71) Applicant: HUAZHONG UNIVERSITY OF SCIENCE AND TECHNOLOGY, Wuhan, Hubei (CN)

(72) Inventors: Yanping Zhang, Hubei (CN); Cheng Zhang, Hubei (CN); Shuhong Huang, Hubei (CN)

(73) Assignee: HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 104 days.

(21) Appl. No.: 15/468,932

(22) Filed: Mar. 24, 2017

(65) Prior Publication Data
US 2018/0066635 A1 Mar. 8, 2018

(30) Foreign Application Priority Data
Sep. 7, 2016 (CN) .......................... 2016 1 0806296

(51) Int. Cl.
*F03G 6/06* (2006.01)
(52) U.S. Cl.
CPC ............. *F03G 6/067* (2013.01); *F03G 6/065* (2013.01); *F03G 6/068* (2013.01);
(Continued)

(58) Field of Classification Search
CPC .......... F03G 6/065; F03G 6/067; F03G 6/068; F03G 2006/061; Y02E 10/46
See application file for complete search history.

(56) References Cited

U.S. PATENT DOCUMENTS

2012/0137683 A1* 6/2012 Jurgen .................... F01D 19/00
60/641.8
2012/0240577 A1* 9/2012 Mandelberg ............ F03G 6/067
60/641.15

(Continued)

FOREIGN PATENT DOCUMENTS

CN 104763553 A * 7/2015

*Primary Examiner* — Mark A Laurenzi
*Assistant Examiner* — Xiaoting Hu
(74) *Attorney, Agent, or Firm* — Hamre, Schumann, Mueller & Larson, P.C.

(57) ABSTRACT

The invention belongs to the technical field of solar thermal power generation equipment, and discloses a combined solar thermal power generation system. The system comprises a parabolic trough collector subsystem, a heat exchanger subsystem, a Rankine cycle power generation subsystem and a dish power generation subsystem; the parabolic trough collector subsystem comprises a trough-type mirror field, a pump and a valve; the heat exchanger subsystem comprises a superheater, an evaporator and a preheater; the Rankine cycle power generation subsystem comprises a temperature-decreased pressure reducer, a steam turbine, an electric generator, a condenser, a condensate pump, a deaerator and a feedwater pump; and the dish power generation subsystem comprises a dish-type mirror field and a Stirling engine set. The system utilizes the heat released by the cold chamber of the Stirling engine by condensed fluid of the Rankine cycle. It provides an extra heat source for the Rankine cycle, which increases the power of the steam turbine and improves the solar to electric efficiency of the thermal power generation system.

4 Claims, 1 Drawing Sheet

(52) U.S. Cl.
CPC .. *F03G 2006/061* (2013.01); *F03G 2006/062* (2013.01); *Y02E 10/46* (2013.01)

(56) References Cited

U.S. PATENT DOCUMENTS

| | | | | |
|---|---|---|---|---|
| 2013/0019599 A1* | 1/2013 | Birnbaum | ............... | F03G 6/067 60/641.15 |
| 2015/0083194 A1* | 3/2015 | Matsushima | ........... | F03G 6/001 136/248 |
| 2015/0330261 A1* | 11/2015 | Held | .................... | F01D 11/003 60/326 |

* cited by examiner

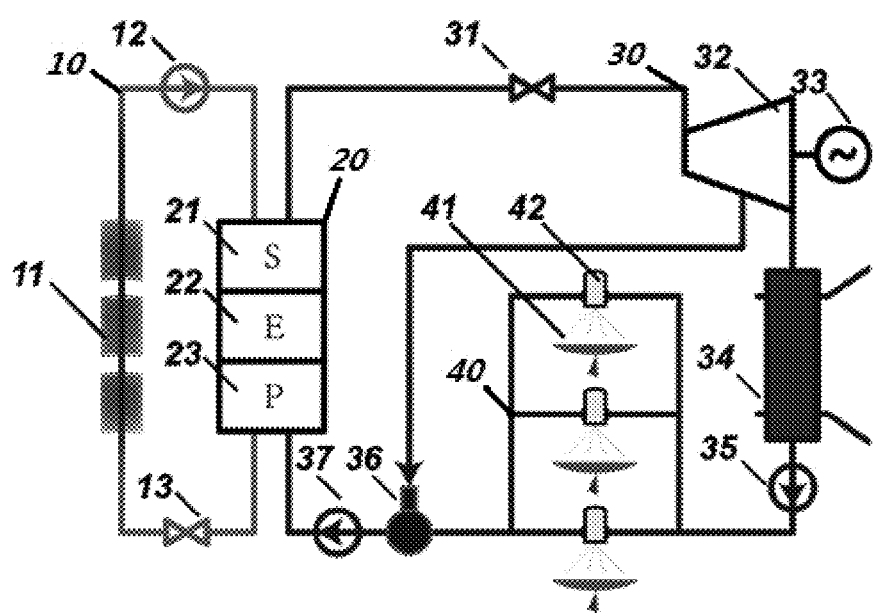

COMBINED SOLAR THERMAL POWER GENERATION SYSTEM

CROSS REFERENCE TO RELATED APPLICATIONS

This application claims the foreign priority under Title 35, United States Code, § 119(a)-(d) of Chinese Patent Application No. 201610806296.5, filed on Sep. 7, 2016 in the Chinese patent office, the disclosures of which are herein incorporated by reference in its entirety.

TECHNICAL FIELD

The invention relates to the technical field of solar thermal power generation equipment, and more particularly relates to a combined solar thermal power generation system.

BACKGROUND

Conventional commercial solar thermal power generation technologies mainly utilize trough/tower/dish solar collectors for collecting thermal energy and then utilizes a Rankine cycle or a Stirling cycle for converting thermal energy collected by the collectors into electric energy. A trough solar thermal power generation system and a tower solar thermal power generation system are used in a large scale and usually employ a Rankine cycle for power generation. A dish-type solar thermal power generation system usually puts a Stirling engine at a focal point of a dish collector and employs a Stirling cycle for power generation because of high concentration ratios, high heat collection temperatures and relatively small scales.

A modern thermal power plant generates power mainly by employing a Rankine cycle which is an ideal thermodynamic cycle process. In trough solar thermal power generation system and the tower solar thermal power generation system heat a heat exchange fluid (for example, air, heat-conducting oil, molten salts etc.) by employing a light-focusing device, and then utilizes the heat exchange fluid for heating a working medium in Rankine cycle, thereby facilitating conversion of heat into power through Rankine cycle. In Rankine cycle, feedwater is heated through an external heat source (for example, a high-temperature flue gas), which is an effective measure for increasing output work.

Stirling cycle is a reversible cycle consisting of two constant-volume endothermic processes and two constant-temperature expansion processes. A heat engine absorbs heat from a high-temperature heat source during high-temperature expansion and releases heat to a low-temperature heat source during low-temperature compression. A Stirling engine realizes conversion from heat to power by employing Stirling cycle, the efficiency thereof is related to the temperature of a low-temperature heat source. The lower the temperature of the low-temperature heat source, the higher the efficiency of the Stirling engine is. Therefore, measurements of effectively taking away thermal energy of the cold chamber of the Stirling engine and reducing temperature of the low-temperature heat source of the Stirling engine help to improve the heat efficiency of Stirling cycle.

Solar thermal power generation technologies capable of facilitating commercial large-scale power generation at present are divided into trough/dish/tower solar thermal power generation technologies according to different concentrator types.

The trough solar thermal power generation system gathers sunlight onto a heat collection pipe which is at the focal line by employing a parabolic reflector. The trough solar thermal power generation system, which usually tracks sun in a single-axis one-dimensional way, has a concentration ratio of 40-80, a heat collection temperature usually not exceeding 400° C. and a fixed heat collection focal line, and is easy for large-scale commercialization. Since the concentration ratio of the parabolic reflector is small and the heat collection temperature is low, the trough solar thermal power generation system usually employs Rankine cycle for power generation, concretely utilizes a trough system to obtain a working medium with thermal energy, then generates high-temperature steam through the working medium with thermal energy and drives a steam turbine generator unit for power generation. During solar thermal power generation Rankine cycle, the trough solar thermal power generation system is low in solar to electric conversion efficiency because of low collector field efficiency and low heat collection temperature.

The dish solar thermal power generation system utilizes a rotary parabolic reflector to gather sunlight onto a heat collector at a focal point of the rotary parabolic reflector. The dish solar thermal power generation system, which usually tracks sun in a double-axis two-dimensional way, has a concentration ratio of 3000 and accordingly has a heat collection temperature of 900-1200° C. Since the concentration ratio of the rotary parabolic reflector is large and the heat collection temperature is high, Stirling cycle is utilized for obtaining a relatively high solar to electric conversion efficiency. A conventional dish solar thermal power generation system usually directly disposes a small-size Stirling engine at the focal point for facilitating power generation, however the solar thermal power generation system hardly achieves large-scale power generation because of limit of the size of the reflector surface and the fact that the Stirling engine moves along with movement of the rotary parabolic reflector automatically tracking sunlight. Meanwhile, the cold chamber of the small-size Stirling engine dissipates heat more difficultly. Additionally, during solar thermal power generation Stirling cycle, the Stirling engine needs a cooling device to take away the heat generated when it works, and this thermal energy is wasted since it is not utilized.

SUMMARY

Aiming at the above mentioned defects of the prior art or improvement requirements, the invention provides a combined solar thermal power generation system, which employs Rankine cycle technologies and Stirling cycle technologies, utilizes the condensed fluid of a Rankine cycle to take away the heat released at the low-temperature heat source during a Stirling cycle and absorb the heat as thermal energy of the fluid of the Rankine cycle, thereby reducing the temperature of the low-temperature heat source of Stirling cycle, also providing a part of heat source for Rankine cycle, providing a part of electric energy for the whole power generation system, increasing the power generation efficiency of a steam turbine and effectively improving the solar to electric efficiency of the solar thermal power generation system.

In order to achieve the above purposes, the invention provides a combined solar thermal power generation system, the power generation system comprises a parabolic trough collector subsystem, a heat exchanger subsystem, a Rankine cycle power generation subsystem and a dish power generation subsystem;

the parabolic trough collector subsystem comprises a trough-type mirror field, a pump and a valve, one end of the trough-type mirror field is connected to the pump and the other end of the trough-type mirror field is connected to the valve;

the heat exchanger subsystem comprises a superheater, an evaporator and a preheater, the superheater is successively connected to the evaporator and the preheater, and also is connected to the pump, and the preheater is connected to the valve;

the Rankine cycle power generation subsystem comprises a temperature-decreased pressure reducer, a steam turbine, an electric generator, a condenser, a condensate pump, a deaerator and a feedwater pump, one end of the temperature-decreased pressure reducer is connected to the superheater, the other end of the temperature-decreased pressure reducer is connected to the steam turbine, the condenser and the condensate pump, the steam turbine is connected to the electric generator and the deaerator, the deaerator is connected to the feedwater pump, and the feedwater pump is connected to the preheater; and the dish power generation subsystem comprises a dish-type mirror field and a Stirling engine set, the dish-type mirror field is used for collecting solar energy and providing heat for the Stirling engine set, and cold chambers of the Stirling engine set is connected to the condensate pump and the deaerator.

Preferably, the trough-type mirror field employs a parabolic trough collector.

Preferably, the parabolic trough collector subsystem employs heat-conducting oil or molten salts as the heat exchange fluid.

To summarize, compared with the prior art, the above-mentioned technical scheme possesses the following beneficial effects:

(1) the invention is capable of effectively improving the output power of solar thermal power generation Rankine cycle; and by utilizing a condensed fluid of Rankine cycle to cool the cold chamber of the Stirling engine, thermal energy released by the cold chamber of the Stirling engine is fully utilized and provides a heat source for Rankine cycle, and the efficiency of the steam turbine is improved.

(2) by utilizing the condensed fluid of Rankine cycle to cool the cold chamber of the Stirling engine, the heat dissipation problem of the cold chamber of the Stirling engine is alleviated, the temperature of the cold chamber of the Stirling engine is reduced, and the Stirling engine is facilitated to run steadily and effectively.

(3) by utilizing the condensed fluid of Rankine cycle to cool the cold chamber of the Stirling engine, the low-temperature condensed fluid is utilized to absorb low-grade thermal energy dissipated by the cold chamber of the Stirling engine, the low-grade thermal energy is fully utilized and the utilization ratio of energy is improved.

BRIEF DESCRIPTION OF THE DRAWINGS

FIG. 1 illustrates the structure of a combined solar thermal power generation system.

DETAILED DESCRIPTION

For clear understanding of the objectives, technical schemes and advantages of the disclosure, and detailed description of the disclosure will be given below in conjunction with accompanying drawings and specific embodiments. It should be noted that the embodiments are only meant to explain the invention, and not to limit the scope of the invention. Additionally, technical features referred by embodiments described below may be mutually combined as long as they do not conflict.

As illustrated in FIG. 1, a combined solar thermal power generation system comprises a parabolic trough collector subsystem 10, a heat exchanger subsystem 20, a Rankine cycle power generation subsystem 30 and a dish power generation subsystem 40;

the parabolic trough collector subsystem 10 comprises a trough-type mirror field 11, a pump 12 and a valve 13, one end of the trough-type mirror field 11 is connected to the pump 12 and the other end of the trough-type mirror field 11 is connected to the valve 13;

the heat exchanger subsystem 20 comprises a superheater 21, an evaporator 22 and a preheater 23, the superheater 21 is successively connected to the evaporator 22 and the preheater 23, and also is connected to the pump 12, and the preheater 23 is connected to the valve 13;

the Rankine cycle power generation subsystem 30 comprises a temperature-decreased pressure reducer 31, a steam turbine 32, an electric generator 33, a condenser 34, a condensate pump 35, a deaerator 36 and a feedwater pump 37, one end of the temperature-decreased pressure reducer 31 is connected to the superheater 21, the other end of the temperature-decreased pressure reducer 31 is connected to the steam turbine 32, the condenser 34 and the condensate pump 35, the steam turbine 32 is connected to the electric generator 33 and the deaerator 36, the deaerator 36 is connected to the feedwater pump 37, and the feedwater pump 37 is connected to the preheater 23; and the dish power generation subsystem 40 comprises a dish-type mirror field 41 and a Stirling engine set 42, the dish-type mirror field 41 is used for collecting solar energy and providing heat for the Stirling engine set 42, and cold chambers of the Stirling engine set 42 are connected to the condensate pump 35 and the deaerator 36.

The parabolic trough collector subsystem 10 is formed by assembling a modularized trough-type integral heat collection device, and the dish power generation subsystem 40 is formed by assembling a modularized dish-type integral heat collection device.

A trough mirror field employs two loops, utilizes a heat-conducting medium for absorbing solar radiation energy and then for heating a working medium in a heat exchanger. The heat-conducting medium may employ heat-conducting oil or a molten salt.

A Rankine cycle subsystem may employs a water working medium or an organic working medium, the working medium of the Rankine cycle subsystem forms a condensed fluid after passing through the condenser 34, the condensed fluid facilitates heat exchange after flowing through the surface of the cold chamber of a Stirling engine, and the working medium of Rankine cycle becomes a superheated steam after passing through a heat exchanger connected to the trough collector field.

A dish subsystem employs a single-dish or double-dish system which facilitates reflection-dish single-axis or double-axis automatic tracking and possesses a fixed receiver, the dish-type mirror field 41 employs a parabolic dish collector capable of automatically tracking sun through a single axis or double axes, the cold chambers of the Stirling engine set 42 are cooled by a fluid condensed by the condenser 34, and the dish collector gathers sunlight to the hot chamber of the Stirling engine so as to provide thermal energy for the Stirling engine.

The four subsystems of the invention operates jointly so as to facilitate conversion between solar energy and electric energy and output electric energy, the parabolic trough collector subsystem 10 and the dish power generation subsystem 40 are relatively independent, the heat-conducting medium in the parabolic trough collector subsystem 10 transfers collected thermal energy to a working medium of the Rankine cycle power generation subsystem in the heat exchanger subsystem 20, the dish-type mirror field 41 of the dish power generation subsystem 40 collects solar energy and provides thermal energy for the Stirling engine set 42, and the Stirling engine set 42 applies work outwardly and generates power.

The working medium of the Rankine cycle power generation subsystem 30 firstly flows through the cold chamber of the Stirling engine set 42 to obtain a part of thermal energy, then enters the heat exchanger subsystem 20 and is heated into a superheated steam, and then the superheated steam enters the steam turbine 32 for working and driving the electric generator 33 to generate electricity.

For more detailed description of the implementation process of the above embodiment, a trough system employs Dow Thermal A heat-conducting oil as a heat transfer medium, a dish system employs air with the pressure of 0.5 MPa as a heat transfer medium, and Rankine cycle employs water as a working medium, and the combined solar thermal power generation system comprehensively utilizing Rankine cycle and Stirling cycle possesses the following related design parameters shown in table 1.

TABLE 1

Related design parameters of the combined power generation system

| Item | Unit | Value |
|---|---|---|
| Solar radiation intensity | kW/m$^2$ | 0.7 |
| Power of the electric generator 33 | kW | 200 |
| Collector field efficiency of the parabolic trough collector subsystem 10 | % | 71.8 |
| Main steam temperature of the steam turbine 32 | ° C. | 340 |
| Main steam pressure of the steam turbine 32 | MPa | 2.35 |
| Exhaust pressure of the steam turbine 32 | MPa | 0.015 |
| Relative internal efficiency of the steam turbine 32 | % | 71.1 |
| Efficiency of the electric generator 33 | % | 97.5 |
| Collector field efficiency of the dish power generation subsystem 40 | % | 80 |

TABLE 1-continued

Related design parameters of the combined power generation system

| Item | Unit | Value |
|---|---|---|
| Hot chamber temperature of the Stirling engine set 42 | ° C. | 722 |
| Compression ratio of the Stirling engine set 42 | — | 3.375 |

In order to further suggest the efficiency improvement of the system by combined usage of Rankine cycle and Stirling cycle, comparison under different numbers of Stirling engines is performed between schemes of the system of the invention and schemes of employing stand alone power generation through Rankine cycle and Stirling cycle. The comparison conditions are as follows: the solar radiation intensity is same, the heat-transfer working medium, the heat collection area and the collector field efficiency of the trough systems are same, the heat collection area and the optical efficiency of the dish systems are same, the hot chamber temperature of the Stirling engine sets 42 is same, the main steam parameters and the exhaust parameter of the steam turbine 32 are same, the power generation efficiency of the group of the steam turbine 32 and the power generator 33 are same. In the stand alone power generation scheme, the cold chambers of the Stirling engine set 42 employ a mature water-cooling technology. The simulation comparison results and the scheme of the combined system of the invention are compared in table 2.

TABLE 2

Comparison between simulation calculation results and those of the scheme of the combined system of the invention

| Number of Stirling engine | Efficiency of the Stirling engine set 42 (kW) | | Generation power of the electric generator 33 (kW) | | Total solar to electric conversion efficiency of the system | |
|---|---|---|---|---|---|---|
| | Scheme of the invention | Scheme of stand alone power generation | Scheme of the invention | Scheme of stand alone power generation | Scheme of the invention | Scheme of standalone power generation |
| 1 | 5.390 | 5.587 | 200 | 198.33 | 0.1674 | 0.1661 |
| 2 | 1.072 | 1.118 | 200 | 196.67 | 0.1706 | 0.1681 |
| 3 | 1.599 | 1.677 | 200 | 195.02 | 0.1737 | 0.1701 |
| 4 | 2.120 | 2.236 | 200 | 193.36 | 0.1768 | 0.1721 |
| 5 | 2.635 | 2.795 | 200 | 191.72 | 0.1798 | 0.1740 |
| 6 | 3.145 | 3.354 | 200 | 190.08 | 0.1827 | 0.1759 |
| 7 | 3.649 | 3.913 | 200 | 188.44 | 0.1855 | 0.1778 |
| 8 | 4.147 | 4.472 | 200 | 186.81 | 0.1883 | 0.1797 |
| 9 | 4.640 | 5.031 | 200 | 185.18 | 0.1910 | 0.1815 |

As shown in table 2, in the provided scheme of the combined system of the invention, the efficiency of the group of the steam turbine and the electric generator 33 is higher than those of schemes of stand alone power generation through Rankine cycle and Stirling cycle, the total solar to electric conversion efficiency of the system is relatively high, and along with increase of the number of the Stirling engine, the efficiency improvement is increased. Therefore, the invention is capable of improving the solar to electric conversion efficiency of a solar thermal power generation system by utilizing a conventional solar heat collection technology.

While preferred embodiments of the invention have been described above, it will be obvious to those skilled in the art that the invention is not limited to disclosure in the embodiments and the accompanying drawings. Any modification, equivalent alterations and improvements without departing from the spirit and the principle of the invention fall within the scope of the invention.

What is claimed is:

1. A combined solar thermal power generation system, comprising:
    a parabolic trough collector subsystem,
    a heat exchanger subsystem,
    a Rankine cycle power generation subsystem, and
    a dish power generation subsystem;
    wherein said parabolic trough collector subsystem comprises a parabolic trough mirror field, a pump, and a valve,
    one end of said parabolic trough mirror field is connected to said pump and the other end of said parabolic trough mirror field is connected to said valve;
    wherein said heat exchanger subsystem comprises a superheater, an evaporator, and a preheater,
    said superheater is successively connected to said evaporator and said preheater, and said superheater also is connected to said pump, and said preheater is connected to said valve;
    wherein said Rankine cycle power generation subsystem comprises a temperature-decreased pressure reducer, a steam turbine, an electric generator, a condenser, a condensate pump, a deaerator, and a feedwater pump,
    one end of said temperature-decreased pressure reducer is connected to said superheater, the other end of said temperature-decreased pressure reducer is connected to said steam turbine, said condenser, and said condensate pump,
    said steam turbine is connected to said electric generator and said deaerator,
    said deaerator is connected to said feedwater pump, and said feedwater pump is connected to said preheater; and
    wherein said dish power generation subsystem comprises a dish mirror field and a Stirling engine set, said dish mirror field is used for collecting solar energy and providing heat for said Stirling engine set, and an inlet of a cold chamber of said Stirling engine set is connected to said condensate pump, an outlet of said cold chamber is connected to said deaerator.

2. The combined solar thermal power generation system according to claim 1, wherein said parabolic trough collector subsystem includes a parabolic trough collector.

3. The combined solar thermal power generation system according to claim 1, wherein said parabolic trough collector subsystem employs heat-conducting oil or molten salts as a heat-conducting working medium.

4. The combined solar thermal power generation system according to claim 1, wherein said dish mirror field includes a heat collector disposed at a focal point of a dish collector for gathering sunlight to heat air to obtain a hot air, the hot air flows to a hot chamber of said Stirling engine set.

* * * * *